United States Patent Office 3,177,133
Patented Apr. 6, 1965

3,177,133
SEPARATION OF CYCLOALKANONE OXIMES
Horst Metzger and Dieter Weiser, Ludwigshafen (Rhine), Germany, assignors to Badische Anilin- & Soda-Fabrik Aktiengesellschaft, Ludwigshafen (Rhine), Germany
No Drawing. Filed Nov. 13, 1962, Ser. No. 237,354
Claims priority, application Germany, Nov. 17, 1961,
B 64,829; May 16, 1962, B 67,268
7 Claims. (Cl. 204—162)

The invention relates to a process for the separation of cycloalkanone oximes from reaction mixtures obtained by the reaction of nitrosyl chloride or of chlorine and nitric oxide with cycloalkanes under the influence of light.

The production of a cycloalkanone oxime or its hydrochloride by reacting a cycloalkane with a nitrosating agent such as nitrosyl chloride or chlorine and nitric oxide under the influence of light in the presence or absence of hydrogen chloride is well known. This process is frequently termed a photonitrosation reaction, which term will be used throughout the following specification.

Large-scale production of cycloalkanone oximes by the photonitrosation reaction has not hitherto been possible because of the formation of oily or crystalline coatings on the glass parts through which the light passes. These coatings prevent the transmission of light through the glass parts into the reaction mixture. Moreover, these coatings made it difficult to remove the heat set free by the reaction. Furthermore, the procedure used for working up the reaction mixture obtained was rather costly in that the reaction product was an oily liquid or a solid crystalline product and had to be separated from unchanged cycloalkane. If the reaction product was oily it could be separated by a conventional liquid-liquid separation method. However, the oily product containing the cycloalkanone oxime hydrochloride, unchanged cycloalkane, nitrosyl chloride, by-products of the reaction, and any solvent used, had to be purified before further processing or storage. As the main application of cycloalkanone oximes is the rearrangement into lactams which serve as initial materials for the production of polymers, the cycloalkanone oximes have to be purified very carefully. Unchanged cycloalkane and any solvents have to be removed and the remaining product has to be washed, again dried, and if necessary recrystallized. All these measures require a considerable expenditure of time, energy and apparatus. If the reaction product is crystalline as it is in some cases when producing cyclododecanone oxime hydrochloride, besides the said disadvantages of oily products the risk exists that pipes, vents and metering devices can be blocked. Another disadvantage of the prior process is the necessity of using conditions which result in spontaneous separation of the reaction products. Hence no solvent or diluent can be used which dissolves the cycloalkanone oxime formed.

It is an object of the present invention to provide a process for separating cycloalkanone oximes from mixtures obtained by the photonitrosation reaction of cycloalkanes, whereby the formation of oily or crystalline coatings on the walls, especially on the glass parts of the reaction vessel, is prevented.

It is a further object of the invention to provide a process for separating cycloalkanone oximes from reaction mixtures of the photonitrosating reaction which can be carried out continuously and on a large scale.

It is another object of the invention to provide a process for the separation of cycloalkanone oximes from mixtures obtained by the photonitrosation reaction, by which process clogging of tubes, vents and metering devices is avoided.

Yet another object of the invention is to provide a process for the separation of cycloalkanone oximes by which the oximes are obtained in a form such that no further purification is necessary if the oximes are to be used for the production of lactams.

An advantage of the invention is that the separation step is also applicable to reaction mixtures containing solvents which dissolve the cycloalkanone oximes or its salts.

These and other objects and advantages are achieved by extracting with a strong mineral acid the cycloalkanone oxime salt from reaction mixtures formed by the action of nitrosyl chloride or of nitric oxide and chlorine on cycloalkanes under the influence of light and, if desired in the presence of an amount of hydrogen chloride additional to the hydrogen chloride formed in the reaction. The extraction step can be carried out batchwise or continuously.

The methods used to produce reaction mixtures containing cycloalkanone oxime by the photonitrosation reaction are known in the art and disclosed, e.g., in U.S. patent specifications No. 2,879,215 and No. 2,885,332 and U.S. patent application Serial No. 126,758, filed June 14, 1961, now U.S. Patent No. 3,060,173, by Otto von Schickh and Horst Metzger.

The cycloalkanes which can be used in the subject process include those with 5 to 12 ring carbon atoms. They may contain 1 to 2 alkyl side chains with 1 to 5 carbon atoms. Examples of suitable hydrocarbons are: cyclopentane, cyclohexane, cycloheptane, cyclooctane, cyclodecane, cyclododecane, methyl cyclopentane, methyl cyclohexane, ethyl cyclohexane, decahydronaphthalene and tetrahydronaphthalene. The extraction process according to the invention is especially well suited to the separation of cyclododecanone oxime salt. The oxime of cyclododecanone is difficult to separate from the reaction mixtures because it separates in the form of the hydrochloride, usually in crystalline form or as a strongly contaminated oil. The crystals tend to become smeary and can then be filtered off only with difficulty.

Suitable nitrostating agents are nitrosyl chloride and mixtures of nitric oxide and chlorine in a molar ratio of from about 3:1 to about 1:1. If desired, the mixture of nitrogen monoxide and chlorine can be passed over a large-surfaced catalyst, e.g., alumina, prior to being fed to the reaction chamber. The nitrosyl chloride can be used in the pure state or mixed with up to one mole nitric oxide. It may be mixed with hydrogen chloride in any proportion.

Effective light has a wavelength of from 300 to 500 m$\mu$.

The reaction can be carried out in a solvent. If the mole ratio of nitrosating agent to hydrocarbon is such that the hydrocarbon is present in excess, the cycloalkane used serves as solvent. However, inert solvents may be used, especially if the initial material is solid at room temperature, e.g., cyclododecane. Suitable solvents are conventional aliphatic saturated halohydrocarbons, e.g., tetrachloromethane.

For the purposes of this invention, benzene or ethers which are also solvents for the cycloalkanone oxime hydrochloride may also be used.

The photonitrosation reaction is carried out at a temperature of from $-30$ to $+40°$ C. and under a pressure of from 1 to about 10 atmospheres.

It is known to be advantageous to carry out the reaction in the presence of an amount of hydrogen chloride beyond that formed in the reaction which is present in the form of the hydrochloric acid salt of the oxime. When using cyclohexane and nitrosyl chloride, the reaction may be represented by the following equation:

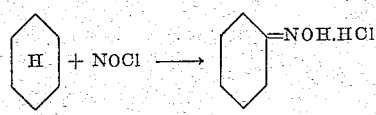

Suitable mineral acids for the separation process according to this invention are those which are immiscible or only slightly miscible with the cycloalkane or the solution of the cycloalkane in an inert organic solvent and by which the cycloalkanone oxime hydrochloride is taken up to form a liquid solution with complete or partial "resalting." By "resalting" we understand a process by which the oxime hydrochloride is converted into a mineral acid salt of the oxime by reaction with the mineral acid with the disengagement of hydrogen chloride. The mineral acid should be substantially inert to the reactants under the conditions of the extraction and should not, or only slightly, dissolve the cycloalkane, nitrosyl chloride and chlorine and any organic solvent which may be present. Mineral acids which are suitable for the purpose are the various phosphoric acids, for example, orthophosphoric acid, pyrophosphoric acid and polyphosphoric acids having a concentration of from 70 to about 90%, and especially 80 to 100% sulfuric acid or sulfuric acid having a content of 0 to 10% of free sulfur trioxide. Concentrated sulfuric acid or 100% sulfuric acid (monohydrate) is generally used.

The process may be carried out, for example, by contacting the mineral acid, which may already contain dissolved cycloalkanone oxime in the form of the salt of the mineral acid used, with the reaction mixture obtained by the photonitrosation reaction of cycloalkanes, in such a way that the oxime hydrochloride contained in the reaction mixture can be dissolved by the mineral acid. The bulk of the hydrogen chloride combined with the oxime hydrochloride is set free in the process and the mineral acid solution is cooled. The extraction may be carried out in the reaction vessel itself or more advantageously in another vessel in which a photochemical reaction is not taking place.

For example, the mineral acid may be arranged as a stationary phase and the reaction mixture may be passed by or through this mineral acid layer, if desired with stirring, and to achieve a desired concentration of oxime in the mineral acid in continuous operation, part of the mineral acid oxime solution may be continuously removed and replaced by fresh mineral acid. It is also possible however for both phases to be stationary, diffusion of the oxime hydrochloride into the mineral acid being promoted by stirring. The mineral acid may also be passed by or through the reaction solution, which may be stationary or moving, until a desired degree of saturation has been achieved.

It is also possible to contact the two components, i.e., reaction mixture and mineral acid, with each other in concurrent or countercurrent, for example by stirring and/or by distribution over suitable baffles or packing means, for example Raschig rings, plates or other flow interrupters. By suitably varying the relative proportions of the two phases or by arranging several extraction stages in series it is possible to keep the oxime content of the mineral acid solution and of the reaction phase at a desired level. Generally, it is advantageous for the molar ratio of cycloalkanone oxime to mineral acid to be less than 1:1, e.g., 1:1.5. However, the ratio should not exceed 1:10. The optimum ratio depends to some extent on the cycloalkanone oximes used and should be adapted to requirements. Thus, for example, by throttling the supply of mineral acid, while keeping the other conditions constant, the concentration of oxime in the mineral acid may be increased, or by increasing the amount of reaction mixture supplied or by more rapid, i.e., more frequent, recycling of the reaction solution, the oxime hydrochloride concentration in the reaction mixture may be decreased. The procedure is advantageously such that the content of oxime hydrochloride in the organic reaction mixture remains below the solubility limit and therefore no solid or oily oxime hydrochloride separates during the reaction. In order to increase the solubility of the oxime hydrochloride in the reaction mixture, a suitable inert solvent may if desired be used in which the hydrochloride is more readily soluble than for example in carbon tetrachloride. Benzene and other aromatic hydrocarbons are examples of such solvents. Benzene is practically not sulfonated by concentrated or 100% sulfuric acid, if the sulfuric acid extract contains more than 25% oxime.

In addition to the apparatus and arrangements herein described, other apparatus and arrangements which are conventional for extraction processes are suitable for separating the oxime by extraction with mineral acids in accordance with this invention.

According to another embodiment of the process according to this invention, cycloalkanone oxime hydrochloride which has already separated in oily form mixed with solvent, cycloalkane and hydrogen chloride or in the case of cyclododecanone oxime hydrochloride which has already crystallized out can be taken up in mineral acid by an extraction such as has been described in principle above, and in this way the crystals or oil can be freed at the same time from the contaminants.

Separation of the mineral acid solution containing oxime as the mineral acid salt from the reaction solution is usually carried out by causing separation of the phases, for example in a settling vessel, and then withdrawing them separately in conventional manner for separating two immiscible liquids and supplying them again to the reaction, to a storage vessel or direct for further processing. It is advantageous to ensure, for example by means of a filter, that no mineral acid is entrained or introduced into the reaction zone of the photonitrosation reaction by escaping hydrogen chloride or as a result of insufficient settling, because otherwise the mineral acid used may in some cases be deposited on glass parts in the reaction vessel which are transmitting light and may dissolve oxime which has been formed there, and this may lead to a troublesome coating.

The time at which the mineral acid extraction is commenced is immaterial because, as already stated, crystals or oil which have already formed can be extracted. To avoid the difficulties described above, however, the extraction should be commenced at a time at which the oxime hydrochloride formed has not yet been deposited.

The extraction temperature is generally adapted to the reaction temperature and the same. It is however possible to carry out the extraction at temperatures which are lower or higher than the reaction temperature, the upper limit of temperature being given by the commencement of the spontaneous exothermic rearrangement reaction of the mixture of oxime and mineral acid. For this reason the temperature is kept below about 70° C., advantageously between 0° and +30° C.

The extraction may be carried out so that cycloalkanone oxime concentrations in the mineral acid of about 5 to 80% by weight are formed. It is advantageous to adjust the concentration at about 25 to 60% by weight because below this value an uneconomically large amount of acid is used and above this value the solution becomes too viscous and therefore difficult to separate.

Solutions of a cycloalkanone oxime or its mineral acid salts in the mineral acid such as are obtainable by the process according to this invention can be subjected direct to the Beckmann rearrangement to an ω-aminofatty acid lactam. For this purpose it is sufficient for example to heat the solution for some time at 100° to 150° C., preferably at the temperature which is optimal for the cycloalkanone oxime used for the Beckmann rearrangement, e.g., for cyclohexanone oxime 105° to 120° C., cyclooctanone oxime 108° to 120° C. and cyclododecanone 115° to 140° C., then to pour the solution onto an amount of water equivalent to at least the weight of the mineral acid, and to separate the lactam precipitated, if desired after neutralization. The lactam thus obtained, if desired after suitable purification, for example by distillation, may be polymerized to a valuable polyamide.

The process according to this invention not only obviates the above-mentioned difficulties in a simple and economical way, but also provides the following advantages over the prior art methods.

There is no formation of crystalline or oily coatings which prevent transmission of light through glass parts of the apparatus, especially when the extraction is not carried out in the photochemical reaction zone itself. Since hydrogen chloride is set free during the extraction, it is no longer necessary to supply further hydrogen chloride to the reaction mixture as soon as saturation of the reaction mixture has occurred. As already stated, the solution of oxime in material acid may be rearranged direct into lactam. Devices for the rather difficult metering of solid oxime hydrochloride are unnecessary in the rearrangement apparatus. Furthermore, in the subject extraction the yield of cycloalkanone oxime is better than in the prior art methods and the formation of byproducts is suppressed.

It is known to carry out the photo-oximation of cycloaliphatic hydrocarbons with nitrosyl chloride and light in the presence of lower aliphatic carboxylic acids or sulfuric acid. Thus it is known for example from U.S. patent specification No. 2,818,380 to use nitrosyl sulfate and a halide as nitrosation agent. Nitrosyl chloride and sulfuric acid are formed during the reaction. Such a method, however, does not permit a continuous extraction of the oxime with the sulfuric acid formed because the latter, by reason of its origin, always contains more or less large amounts of nitrosyl sulfate which would be discharged together with the oxime and would give rise to difficulties for example in the Beckmann rearrangement by reason of the formation of explosive N-nitrosolactam. Waste of chemical reagents is also involved. According to U.S. patent specification No. 2,719,116, aliphatic carboxylic acids having up to four carbon atoms are added in the photo-nitrosation reaction of cyclohexane with nitrosyl chloride to prevent coating the light-transmitting glass parts of the apparatus. Although these carboxylic acids, insofar as they are not capable of expelling the hydrogen chloride and also are not suitable for any subsequent Beckmann rearrangement of the oxime to ω-aminofatty acid lactam.

The invention is further illustrated by, but not limited to, the following examples. The parts, unless otherwise stated, are parts by weight. Parts by weight and parts by volume bear the same relation to each other as g. and cc.

Example 1

A solution of 70 parts of cyclododecane in 120 parts of carbon tetrachloride is charged to an apparatus consisting of an irradiation vessel having light sources, an extractor and a settling vessel, together with the relevant connecting pipes, pumps, coolers and agitators. The solution is pumped in circulation so that it leaves the top of the irradiation vessel and flows into the well agitated extractor through a tube extending from the top thereof almost to the bottom. Thence the solution passes through an overflow arranged at the side at a suitable height into a settling vessel and thence back into the reaction chamber. The reaction solution is saturated at 15° to 20° C. with hydrogen chloride. A layer of 10 parts of concentrated sulfuric acid is placed in the extractor below the reaction solution, the light sources are switched on and, while continuously pumping the reaction solution through the above-mentioned circulation system, 0.42 part of nitrosyl chloride and 0.95 part of cyclododecane per hour are supplied in liquid form into the irradiation vessel which is provided with a stirrer. After about eight hours, the sulfuric acid solution is found by analysis to contain 8.5 parts of cyclododecanone oxime. 1.25 parts of concentrated sulfuric acid is additionally added per hour to the extractor from this point and at the same time sulfuric acid oxime solution is withdrawn at such a rate that the level of sulfuric acid is maintained constant.

The reaction is stopped after 120 hours, when a total of 50.4 parts of nitrosyl chloride, 114 parts of cyclododecane and 150 parts of concentrated sulphuric acid have been added. The remaining sulfuric acid is removed and the reaction solution distilled to determine the yield. 81 parts of unused cyclododecane are recovered.

The sulfuric acid solution is converted into laurolactam by heating to 125° to 130° C. and then diluting with water. The laurolactam is filtered off, washed and dried. 128 parts of crude laurolactam having the melting point 149° C. is obtained (94% of the theory with reference to the 103 parts of cyclododecane used).

Example 2

A cooling vessel of glass or quartz provided with an inlet and outlet and open at the top is placed within a cylindrical stirring vessel 21 cm. in length and 9.5 cm. in internal width, and a mercury vapour immersion lamp of 80 watts rating is provided within the cooling vessel. 430 g. of cyclododecane in 800 g. of carbon tetrachloride is charged into the reaction chamber. This solution is pumped by means of a glass centifugal pump through a washing bottle filled with sulfuric acid so that the solution leaves the bottom of the reaction vessel, passes through the pump and then the washing bottle and finally flows back again into the top of the reaction vessel.

The reaction solution is saturated with hydrogen chloride at 15° to 20° C. and 6.5 g. of nitrosyl chloride is dissolved therein. The mixture is irradiated while being cooled to 15° to 20° C. and with continuous recycling of the solution. After two hours another 6.5 g. of nitrosyl chloride is added and this is repeated after another two hours, so that a total of 19.5 g. of nitrosyl chloride is introduced within six hours. The process is then stopped. During this period, no crystals are deposited, the carbon tetrachloride solution is clear and at the end of the reaction is colored only very slightly yellow. The lower sulfuric acid solution, colored yellow brown, which has increased in volume and weight, is run off from the washing bottle and mixed with 1000 g. of ice while stirring. The practically colorless cyclododecanone oxime thereby precipitated is filtered off, washed with water and dried to constant weight. 49.0 g. of oxime having the melting point 133° C. is obtained, i.e., 83% of the theory with reference to nitrosyl chloride added. The remaining carbon tetrachloride solution is washed with dilute caustic soda solution and distilled. 386 g. of cyclododecane are thus recovered. The yield of oxime, referred to the cyclododecane used up, is 95% of the theory.

Example 3

The procedure of Example 2 is followed, but the separated sulfuric acid solution of the oxime is dripped within 20 minutes while stirring onto a solution of 5 g. of laurolactam in 10 g. of concentrated sulfuric acid which has been preheated to 125° C., the temperature of the reaction mixture being kept at 125° to 130° C., if necessary by cooling or heating.

When all has been dripped in, the reaction mixture is stirred for another ten minutes at 125° C., then cooled to 80° C. and poured into 200 g. of water or ice while stirring. Laurolactam thus separates in crystalline form. It is filtered off, washed with water and dried. Allowing for the 5 g. of laurolactam contained in the rearrangement solution, 48.5 g. of crude laurolactam having the melting point 149° C. is obtained and by sublimation 48.0 g. of pure laurolactam having the melting point 151° C. This is 93% of the theory with reference to the cyclododecane used up.

By using 60 g. of monohydrate (100% sulfuric acid) instead of 60 g. of concentrated sulfuric acid, 49 g. of cyclododecanone oxime or 47.5 g. of pure laurolactam is obtained in an entirely analogous way. With 80 g. of 10% oleum instead of the concentrated sulfuric acid, 48 g. of cyclododecanone oxime or 40.5 g. of laurolactam is obtained.

*Example 4*

A solution of 400 g. of cyclododecane in 500 g. of benzene is circulated through 100 g. of 80% sulfuric acid by means of a pump in the apparatus described in Example 2. The benzene solution is saturated with hydrogen chloride at 20° C. and the further procedure of Example 2 is followed. When the reaction has ended, the lower sulfuric acid layer is separated and mixed with 1000 g. of ice while stirring. The deposited cyclododecanone oxime is filtered off, washed with water and dried. 49.3 g. of oxime having the melting point 133° C. is obtained. The remaining colorless benzene solution is shaken up with 2 N caustic soda solution and then distilled. 356 g. of cyclododecane is recovered and the yield of cyclododecanone oxime is 96% of the theory with reference to the cyclododecane used up.

By using 100% sulfuric acid instead of 80% sulfuric acid, 49 g. (95% of the theory) of cyclododecanone oxime is obtained in an entirely analogous way.

By using 300 g. of commercial 85%, o-phosphoric acid instead of sulfuric acid, 48 g. (93.5% of the theory) of cyclododecanone oxime can be isolated by an analogous procedure.

In all cases the glass or quartz lamp cooling vessel remains entirely free from coating on the side facing the reaction mixture.

*Example 5*

200 parts of cyclohexane is charged into the apparatus described in Example 1 and saturated with hydrogen chloride at 10° to 15° C. 10 parts of 100% sulfuric acid is then placed in the extraction vessel as a layer beneath the hydrocarbon, sulfuric acid and reaction mixture are mixed in the extraction vessel, and the sulfuric acid separated in the settling vessel and 0.42 part of nitrosyl chloride and 0.40 part of cyclohexane are introduced per hour into the agitated irradiation vessel after switching on the light sources while continuously circulating the reaction liquid through the system. The reaction temperature is kept at 10° to 15° C. by appropriate cooling. After eight hours, the sulfuric acid solution is found by analysis to contain 4.8 parts of cyclohexanone oxime. An additional 1.25 parts of 100% sulfuric acid is then added per hour to the extraction vessel and at the same time sulfuric acid oxime solution is withdrawn at such a rate that the level of sulfuric acid remains constant.

The reaction is stopped after 120 hours, after a total of 50.4 parts of nitrosyl chloride, 48 parts of cyclohexane and 150 parts of 100% sulfuric acid have been added. After removal of the residual sulfuric acid, the reaction solution is washed with 2 N caustic soda solution, dried and distilled to determine the yield. 180 parts of unused cyclohexane is recovered. The sulfuric acid solution is heated to 110° to 115° C., then diluted with water and brought to pH 7 with dilute caustic soda solution. The free caprolactam thus formed is taken up in benzene and isolated by distillation. 74 parts of crude caprolactam having the melting point 70° C. are obtained, i.e., 85% of the theory with reference to nitrosyl chloride used and 91% of the theory with reference to the 60 parts of cyclohexane used up.

*Example 6*

A cooling vessel of glass or quartz provided with an inlet and outlet and open at the top is placed within a cylindrical agitated vessel 21 cm. in length and 9.5 cm. in internal width, and a mercury vapor immersion lamp of 80 watts rating is provided within the cooling vessel. 800 g. of cyclooctane is charged to the reaction chamber. This is pumped by means of a glass centrifugal pump through a washing bottle filled with sulfuric acid so that the solution leaves the bottom of the reaction vessel, passes through the pump and then the washing bottle and finally flows back again into the top of the reaction vessel.

6.0 g. of nitrosyl chloride is dissolved in the cyclooctane at 15° to 20° C. and the mixture then irradiated while cooling to 15° to 20° C. and with continuous circulation of the solution by pumping. After two hours another 6.0 g. of nitrosyl chloride is added and the addition repeated after another two hours so that a total of 18.0 g. of nitrosyl chloride is introduced within four hours. After an irradiation period of seven hours, the reaction is stopped. No crystals are deposited throughout the whole of this period. The cyclooctane phase is clear and practically colorless at the end of the reaction. The lower yellow brown sulfuric acid solution which has increased in volume and weight is run off from the washing bottle and mixed with 300 g. of ice while stirring. The acidity of the solution is neutralized to pH 5 by adding dilute caustic soda solution, the deposited oxime is taken up in ether. By distillation, 35.0 g. of cyclooctanone oxime having the melting point 41° C. are obtained, i.e., 90% of the theory with reference to nitrosyl chloride supplied. The remaining cyclooctane layer is washed with dilute caustic soda and distilled. 770.5 g. of cyclooctane is recovered. The yield of oxime, with reference to the cyclooctane used up, is 94% of the theory.

*Example 7*

The procedure of Example 6 is followed but the separated surfuric acid solution of cyclooctanone oxime is dripped while stirring within twenty minutes into a solution of 5 g. caprylolactam in 10 g. of concentrated sulfuric acid which has been heated to 115° C., and the temperature of the reaction mixture is kept at 112° to 115° C. by cooling or heating.

After all has been dripped in, the reaction mixture is stirred for another ten minutes at 115° C., cooled to 50° C. and poured into 200 g. of water or ice while stirring. The mixture is neutralized to pH 7 with dilute caustic soda solution and the caprylolactam formed is taken up in benzene. In addition to the 5 g. of caprylolactam contained in the rearrangement solution, 33.5 g. of caprylolactam having the melting point 75° C. is obtained by distillation; this is 90% of the theory with reference to cyclooctane used up.

*Example 8*

A solution of 400 g. of cyclooctane in 500 g. of benzene is pumped in circulation through 100 g. of 80% sulfuric acid in the apparatus described in Example 6. The benzene solution is saturated at 20° C. with hydrogen chloride and the further procedure of Example 6 followed. After the reaction has ended, the lower sulfuric acid layer is separated and mixed with 300 g. of ice while stirring. The mixture is then brought to pH 5 by adding dilute caustic soda solution while stirring and cooling; the precipitated cyclooctanone oxime is filtered off and dried. A further amount of oxime is obtained by shaking the mother liquor with ether. 35.5 g. of oxime is obtained in all. The remaining colorless benzene solution is shaken up with 2 N caustic soda solution and then distilled. 371 g. of cyclooctane is thus recovered. The yield of cyclooctanone oxime is 95% of the theory with reference to the cyclooctane used up.

By using 100% sulfuric acid instead of 80% sulfuric acid, 35.0 g. (94% of the theory) of cyclooctanone oxime is obtained in an entirely analogous way.

By using 300 g. of commercial 85% o-phosphoric acid instead of sulfuric acid, 34.0 g. (91.5% of the theory) of cyclooctanone oxime is obtained by an analogous procedure.

We claim:

1. A process for separating a cycloalkanone oxime from a reaction mixture as formed by the action of a nitrosating agent selected from the group consisting of nitrosyl chloride and of a mixture of nitric oxide and chlorine in the presence of hydrogen chloride on a cycloalkane of 5 to 12 carbon atoms under the influence of light which comprises removing the reaction mixture from the reaction zone in which the photochemical reaction takes place into a zone in which a photochemical reaction is not taking place and adding in this latter zone a strong mineral acid selected from the group consisting of sulfuric acid, orthophosphoric acid, pyrophosphoric acid, and polyphosphoric acid, mixing the mineral acid with the reaction mixture, separating the two phases, recycling the organic phase into the reaction zone in which the photochemical reaction takes place and removing the mineral acid solution of the cycloalkanone oxime.

2. A process according to claim 1, wherein the cycloalkanone oxime is separated in the form of a salt of a mineral acid.

3. A process according to claim 1, wherein as mineral acid sulfuric acid of from 80 to 100% strength is used.

4. A process according to claim 1 wherein as mineral acid sulfuric acid containing up to 10% free sulfur trioxide is used.

5. A process according to claim 1 wherein the cycloalkanone oxime is cyclododecanone oxime.

6. A process according to claim 1 wherein the cycloalkanone oxime is cyclohexanone oxime.

7. A process according to claim 1, wherein the extraction is carried out continuously.

References Cited by the Examiner

UNITED STATES PATENTS 2,818,380   12/37   Welz  ----------------  204—162
3,090,739    5/63   Ito  ------------------  204—162

JOHN H. MACK, *Primary Examiner.*

JOHN R. SPECK, *Examiner.*